(12) United States Patent
Wei et al.

(10) Patent No.: US 11,640,158 B2
(45) Date of Patent: May 2, 2023

(54) DATA SECURITY SHARING METHOD IN MULTI-EDGE NODE COLLABORATION MODE UNDER INDUSTRIAL CLOUD ENVIRONMENT

(71) Applicant: CHONGQING UNIVERSITY OF POSTS AND TELECOMMUNICATIONS, Chongqing (CN)

(72) Inventors: Min Wei, Chongqing (CN); Jiuchao Mao, Chongqing (CN); Ping Wang, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 478 days.

(21) Appl. No.: 16/963,261

(22) PCT Filed: Apr. 27, 2018

(86) PCT No.: PCT/CN2018/084753
§ 371 (c)(1),
(2) Date: Jul. 20, 2020

(87) PCT Pub. No.: WO2019/165698
PCT Pub. Date: Sep. 6, 2019

(65) Prior Publication Data
US 2021/0373537 A1    Dec. 2, 2021

(30) Foreign Application Priority Data
Mar. 2, 2018  (CN) .......................... 201810175642.3

(51) Int. Cl.
*G05B 19/418*     (2006.01)
*H04L 9/08*       (2006.01)
(Continued)

(52) U.S. Cl.
CPC ..... *G05B 19/4185* (2013.01); *G05B 19/4183* (2013.01); *H04L 9/008* (2013.01);
(Continued)

(58) Field of Classification Search
CPC . G05B 19/4185; G05B 19/4183; H04L 9/008; H04L 9/0816; H04L 9/0819; H04L 9/085; H04L 63/065
See application file for complete search history.

(56) References Cited

U.S. PATENT DOCUMENTS

2012/0230282 A1* 9/2012 Wu ........................ H04W 28/16
                                                   370/328
2016/0105402 A1* 4/2016 Soon-Shiong ......... G16H 40/20
                                                   713/164
(Continued)

FOREIGN PATENT DOCUMENTS

CN    102076024 A        5/2011
CN    106506474 A  *     3/2017    ......... H04L 63/0428
(Continued)

OTHER PUBLICATIONS

International Search Report for PCT/CN2018/084753 dated Sep. 12, 2018, ISA/CN.
(Continued)

*Primary Examiner* — Darshan I Dhruv
(74) *Attorney, Agent, or Firm* — Yue (Robert) Xu; Apex Attorneys at Law, LLP

(57) ABSTRACT

Provided is a data security sharing method for multiple edge nodes to operate in a collaboration mode under an industrial cloud environment. The method includes: firstly, edge nodes that need collaborative computing separately applying for a shared key to an authority center; secondly, the authority center generating a shared key and issuing the key to each of the edge nodes applying for participation in the collab-
(Continued)

orative computing; again, the edge nodes combining industrial characteristics to generate an interference factor set, and adding different interference factors for different types of data; then, the data of the edge nodes is implemented with improved homomorphic encryption and is uploaded to an industrial cloud platform; and finally, the industrial cloud platform performing homomorphic analysis and computing on the data uploaded by each of the edge nodes, and issuing the data back to each of the edge nodes.

7 Claims, 3 Drawing Sheets

(51) Int. Cl.
H04L 9/06 (2006.01)
H04L 9/00 (2022.01)
H04L 9/40 (2022.01)
(52) U.S. Cl.
CPC ............ *H04L 9/085* (2013.01); *H04L 9/0816* (2013.01); *H04L 9/0819* (2013.01); *H04L 63/065* (2013.01)

(56) References Cited

U.S. PATENT DOCUMENTS

2016/0330209 A1* 11/2016 Iacob .................... H04L 9/0825
2016/0359965 A1* 12/2016 Murphy ............. H04L 67/1044
2017/0244682 A1   8/2017 Chen
2017/0289157 A1* 10/2017 Dawoud ............. H04L 63/0823
2018/0330079 A1* 11/2018 Gray ..................... H04L 9/0894

FOREIGN PATENT DOCUMENTS

EP            2890084 A1 *  7/2015 ......... H04L 63/0428
WO    WO-2016075512 A1 *  5/2016 ........... G06F 17/246

OTHER PUBLICATIONS

Zhou, Shungan, Research on Key Technologies of Data Sharing and Repairing in Cloud Computing environment. Information & Technology, China Doctoral Dissertations Full-text Database, Jun. 15, 2017, section 4.3.

Xi, Xiaofeng, et al. An Improved Fully Homomorphic Encryption Scheme under Conditions of Cloud Computing. Computer Technology and Development, vol. 25, No. 2, Feb. 28, 2015, section 2.

* cited by examiner

DATA SECURITY SHARING METHOD IN MULTI-EDGE NODE COLLABORATION MODE UNDER INDUSTRIAL CLOUD ENVIRONMENT

This application is the national phase of International Application No. PCT/CN2018/084753, titled "DATA SECURITY SHARING METHOD IN MULTI-EDGE NODE COLLABORATION MODE UNDER INDUSTRIAL CLOUD ENVIRONMENT", filed on Apr. 27, 2018, which claims the priority to Chinese Patent Application No. 201810175642.3, titled "DATA SECURITY SHARING METHOD IN MULTI-EDGE NODE COLLABORATION MODE UNDER INDUSTRIAL CLOUD ENVIRONMENT", filed on Mar. 2, 2018 with the China National Intellectual Property Administration (CNIPA), which is incorporated herein by reference in its entirety.

TECHNICAL FIELD

The present disclosure belongs to an industrial field, and relates to a data security sharing mechanism for collaborative calculation between multiple edge nodes on a cloud platform, under an industrial cloud environment.

BACKGROUND

Edge computing is an open platform that integrates core capabilities of network, computing, storage, and application on an edge of the network close to a source of objects or data, and provides edge intelligent services nearby, to meet key requirements of industry digitalization with respect to agile connection, real-time business, data optimization, application intelligence, security and privacy protection.

An edge node can analyze short-cycle data in real time, to better support real-time intelligent processing and execution of local business. The edge node can also perform preliminary screening on the data, and transmit valuable data to an industrial cloud platform or forward the valuable data to other edge nodes.

During data uploads by an edge node to a cloud platform, if data protection measures of the cloud platform are not perfect, it means sensitive data and private data uploaded by the edge node may be stolen, and the edge node loses control of the data. Once privacy data or sensitive data of an edge node in a factory is stolen by a competitor or a malicious attacker, such damage is undoubtedly fatal to the factory. In order to ensure the confidentiality and integrity of data of an edge node on a cloud platform, the edge node generally uploads data to the cloud platform by encryption. However, the cloud platform cannot provide calculating services for the ciphertext from the edge node without an end-to-end key.

At present, a fully homomorphic encryption method can effectively ensure both confidentiality and operability of data transmission between an edge node and an industrial cloud platform. The industrial cloud platform directly operates on a ciphertext, and outputs a ciphertext which is directly returned to the edge node. Thus, the industrial cloud platform can make an analysis and calculation on data without decrypting the data. The confidentiality of the data being transmitted to the cloud can be ensured, since the edge node does not share the key with the industrial cloud.

During collaboration between multiple edge nodes, each of edge nodes participating in the collaboration send data to the industrial cloud platform in a form of ciphertext, and the industrial cloud platform makes an analysis and calculation on the ciphertext data from each of the edge nodes, and returns a result to each of the edge nodes. However, if each of the edge nodes encrypts data with its own key when using the homomorphic encryption method described above, which ensures the confidentiality of data transmission between the edge node and the industrial cloud, but results that homomorphic calculation cannot be performed, at the industrial cloud platform, on the data sent by each of the edge nodes to the industrial cloud platform, due to different keys used by the edge nodes. That is, the cloud platform cannot fuse and process the ciphertexts and feed back results to the edge nodes, during collaboration between multiple edge nodes.

Therefore, it is required to solve the problem in the present disclosure that how to ensure both security of data and interoperability of data between multiple edge nodes during collaborative calculation between different edge nodes on a cloud platform.

SUMMARY

In view of this, the present disclosure aims to provide a data security sharing method for collaborative calculation between multiple edge nodes on a cloud platform. With the method, confidentiality of data stored on an industrial cloud platform by a single edge node and interoperability of data between multiple edge nodes both can be ensured.

To obtain the above objects, technical solutions provided in the present disclosure are as follows.

A data security sharing method for multiple edge nodes to operate in a collaboration mode under an industrial cloud environment, where objects involved in the method includes: edge nodes, an industrial cloud platform, and an authority center, and the method includes the following steps:

in S1, applying, by each of the edge nodes wanting to participate in collaborative calculation, to the authority center for a shared key;

in S2, allocating, by the authority center, a different ID number to each of the edge nodes applying for the shared key, where the ID number is recorded as $ID^m_{edge}$, m={i, . . . , j}, m represents a node number set, and i and j each represents a node number;

in S3, exchanging ID numbers between edge nodes in a same collaborative calculation group, so that each of the edge nodes in the same collaborative calculation group stores ID numbers of all the edge nodes in the same collaborative calculation group; sorting, by the authority center, all edge nodes in each of the collaborative calculation groups based on an order of the ID numbers of the edge nodes from small to large, to form a different set, where the set is recorded as $M^s$; assuming that S collaborative calculation groups are under control of the authority center, then s={1, . . . , S}, $M^s=\{ID^i_{edge}, \ldots, ID^j_{edge}\}$, where a different set $M^s$ corresponds to a different node number set; performing a same function operation $F(M^s)$ on the set $M^s$ corresponding to each of the collaborative calculation groups to obtain a different result, which is recorded as $R^s$; the set $M^s$ having a one-to-one correspondence with the result $R^s$, that is, function operation $F(M^1)$ is performed on a set $M^1$ to obtain $R^1$, and function operation $F(M^2)$ is performed on a set $M^2$ to obtain $R^2$, and so on; and identifying, by the authority center, different collaborative calculation groups based on $R^s$, to distribute different keys for the different collaborative calculation groups;

where the reason for introducing the result $R^s$ here is that, in a control region of the authority center, multiple collaborative relationships may be formed between multiple edge nodes. For example, a collaborative relationship is formed between an edge node $ID^i_{edge}$ and an edge node $ID^j_{edge}$, and the two nodes may perform a collaborative calculation, while another collaborative relationship is formed between an edge node $ID^i_{edge}$ and an edge node $ID^k_{edge}$, and the two nodes may perform another collaborative calculation. Thus the authority center can identify different collaborative calculation groups based on $R^s$, so as to distribute different keys for the different collaborative calculation groups;

in S4, performing, by each of the edge nodes $ID^m_{edge}$, encryption operation $E(ID^m_{edge}||R^s)$ on data $ID^m_{edge}||R^s$, and uploading, by each of the edge nodes $ID^m_{edge}$, a result of the encryption operation $E(ID^m_{edge}||R^s)$ to the authority center, where "||" represents a connector for string, and E(x) represents an encryption function, where the specific encryption algorithm is not limited in the present disclosure;

in S5, performing decryption operation $D(ID^m_{edge}||R^s)$, by the authority center, with a pre-configured key; extracting, by the authority center, different collaborative calculation groups based on different results $R^s$; sorting edge nodes in each of the extracted collaborative calculation groups based on the order described in step S3, to form a different set $M^{s*}=\{ID^i_{edge*}, \ldots ID^j_{edge*}\}$; performing a same function operation $F(M^{s*})$ to obtain a different result $R^{s'}$; where D(x) is a decryption function for decrypting data encrypted by E(x);

in S6, randomly constructing, by the authority center, a different $\mu*n$ matrix G for each of the collaborative calculation groups satisfying $R^s=R^{s'}$, where elements in the matrix G belong to a finite field GF(q), q is a large prime number, $\mu$ represents the number of rows of the matrix G, that is, a length of each column matrix of the matrix G, and n represents the number of edge nodes in each of the collaborative calculation groups;

in S7, randomly generating, by each of the edge nodes $ID^m_{edge}$, a column matrix $A_{(m)}$ having $\mu$ elements, performing an encryption operation $E(A_{(m)}||R)$, by each of the edge nodes $ID^m_{edge}$, on the column matrix $A_{(m)}$, where R is a specific value of calculation result of each of the collaborative calculation groups, and uploading, by each of the edge nodes $ID^m_{edge}$, a result of the encryption operation $E(A_{(m)}||R)$ to the authority center, where all elements of the column matrix belong to the finite field GF(q), and each of the edge nodes $ID^m_{edge}$ has a one-to-one correspondence with a column matrix $A_{(m)}$, that is, an edge node $ID^1_{edge}$ corresponds to a column matrix $A_{(1)}$, an edge node $ID^2_{edge}$ corresponds to a column matrix $A_{(2)}$, and so on;

in S8, performing decryption operation $D(A_{(m)}||R^s)$, by the authority center, with the pre-configured key; extracting, by the authority center, a column matrix corresponding to each of the edge nodes in each of the collaborative calculation groups based on $R^s$; randomly recombining, by the authority center, all column matrixes corresponding to each of the collaborative calculation groups into a different $n*\mu$ matrix D; then performing, by the authority center, matrix operation $T_{\mu*\mu}=G*D$, where $T_{\mu*\mu}$ is a newly generated matrix for generating the shared key; finally, performing, by the authority center, hash operation by introducing R and the matrix $T_{\mu*\mu}$ to generate the shared key, and distributing, by the authority center, the generated different shared key to a corresponding collaborative calculation group;

in S9, generating, by each of the edge nodes in each of the collaborative calculation groups, a different interference factor set X based on industrial characteristics, where the interference factor set X includes different interference factors $\delta$, and the different interference factors $\delta$ are added for different types of data;

in S10, performing, by each of the edge nodes in each of the collaborative calculation groups, fully homomorphic encryption on data by introducing the shared key and the interference factor, and uploading, by each of the edge nodes in each of the collaborative calculation groups, a ciphertext to the industrial cloud platform; and in S11, making, by the industrial cloud platform, homomorphic analysis and calculation on the full homomorphic encrypted ciphertext, and distributing, by the industrial cloud platform, a processing result to a corresponding collaborative calculation group.

In an embodiment, in step S3, the authority center performs the same function operation $F(M^s)$ for each collaborative relationship to obtain the different result $R^s$:

$$R^s=F(M^s),$$

where, the function F is any mathematical function to perform mathematical calculations once or more on the set $M^s$ of edge nodes, and the specific mathematical function is not limited in the present disclosure.

Since an ID number of each of the edge nodes is unique, and the set $M^s$ formed by all the edge nodes in each of the collaborative calculation groups is unique, the result $R^s$ obtained by the function operation $F(M^s)$ is unique. The authority center can identify different collaborative calculation groups based on the unique $R^s$, so as to distribute different keys for different collaborative calculation groups.

In an embodiment, in step S5, the authority center determines whether $R^s$ is equal to $R^{s'}$, to prevent a forged attack from an illegal node.

If each of the edge nodes in the same collaborative calculation group uploads its ID number to the authority center, the set $M^{s*}$ obtained by the authority center is the same as the set $M^s$ of the edge nodes in step S3. Then, same calculated results are obtained by performing the same function operation F on the two same sets, that is, $R^s=R^{s'}$.

For example, an illegal edge node $ID^i_{edge}$ has not reached a collaborative relationship with an edge node $ID^j_{edge}$, but lies to the authority center that it had reached the collaborative relationship with the edge node $ID^j_{edge}$, and the illegal edge node $ID^i_{edge}$ uploads a set $M^s$ consisting of ID numbers of the edge node $ID^i_{edge}$ and the edge node $ID^j_{edge}$ to the authority center. Then the authority center will send a same shared key to the illegal edge node $ID^i_{edge}$ and the legal edge node $ID^j_{edge}$, thus the illegal edge node $ID^i_{edge}$ can access data of the edge node $ID^j_{edge}$ with the shared key. In the forged attack from the illegal node, only the illegal edge node $ID^i_{edge}$ uploads $ID^i_{edge}||R^s$ to the authority center, while the edge node $ID^j_{edge}$ does not upload $ID^j_{edge}||R^s$ to the authority center. Therefore, the edge node set $M^{s*}$ obtained by the authority center is inconsistent with the set $M^s$ sent by the illegal node, then different results are obtained by performing the same function operation F(x) on the two different sets, that is, $R^s \neq R^{s'}$.

In an embodiment, in the step S8, the authority center performs hash operation $Key_{share}=Hash(T_{\mu*\mu}||R)$ by introducing $R^s$ and the matrix $T_{\mu*\mu}$ to generate the shared key, and distributes the generated shared key to the corresponding collaborative calculation group. The reason for the authority center to perform hash operation by introducing R and the matrix $T_{\mu*\mu}$ is to avoid generating a same key for different collaborative calculation groups.

In an embodiment, in the step S9, an enterprise user chooses one or more of industrial protocol, network ID, data source address, data attribute, sensor type, and processing priority as an interference factor, to achieve more fine-grained sharing of industrial data. In different industrial scenarios, the enterprise user may choose a different industrial attribute as an interference factor according to their own situation, and determine a byte length of the industrial attribute. FIG. 2 shows byte lengths of the interference factors according to the present disclosure.

In an embodiment, in step S10, on a basis of an existing integer-based fully homomorphic encryption algorithm, an encryption function $c=m'+2r+\Sigma_{i\in S}x_i$ with $x_i=p_{sk}q+2r_i$ is improved to $c=m'+\delta+2r+\Sigma_{i\in S}x_i$ with $x_i=p_{sk}qp_{share}+2r_i$, and a decryption function $m'=(c \bmod p_{sk}) \bmod 2$ is improved to $m'=((c-\delta) \bmod p_{share}) \bmod 2$, to realize fine-grained sharing of data in collaborative calculation between multiple edge nodes. Where $p_{share}$ represents a shared key, S represents an interference factor, c represents an encrypted ciphertext, m' represents a plaintext, q, r and $r_i$ each represents a random large prime number, $x_i$ represents an i-th public key sample in a public key sample set L, and $p_{sk}$ represents a private key.

In an embodiment, the data security sharing method for the multiple edge nodes to operate in the collaboration mode further includes:

during collaborative calculation between multiple edge nodes, if the authority center detects that an edge node is an illegal edge node, updating, by the authority center, a shared key of a collaborative calculation group where the illegal edge node is located and distributing, by the authority center, the updated shared key to other edge nodes except the illegal edge node in the collaborative calculation group, which prevents the illegal edge node from continuing to access, with a non-updated key, collaborative calculation data between other edge nodes in the same collaborative calculation group, and ensures backward security of the collaborative calculation data; and updating a key if a new edge node wants to join a collaborative calculation group during the collaborative calculation group performs a collaborative calculation, to prevent the new edge node from obtaining, with the non-updated key, collaborative calculation data between other edge nodes which is generated before the new edge node participates in the collaborative calculation, to ensure the forward security of the data.

The present disclosure has the following beneficial effects.

1) A key management mechanism is designed, including a key generation mechanism and a key update mechanism. With the key generation mechanism, a forged attack from an illegal edge node can be prevented during the collaborative calculation between multiple edge nodes. With the key update mechanism, forward and backward security of the data in the collaborative calculation between multiple edge nodes can be ensured.

2) The edge node generates an interference factor set X based on industrial characteristics, the interference factor set X includes different interference factors δ, and the different interference factors δ are added for different types of data, realizing fine-grained sharing of data in collaborative calculation between multiple edge nodes.

3) Based on the existing integer-based fully homomorphic encryption algorithm, shared key Key$_{share}$ and interference factor δ are introduced to ensure both security of data and interoperability of data between multiple edge nodes.

BRIEF DESCRIPTION OF THE DRAWINGS

In order to more clearly illustrate the purpose, technical solutions and beneficial effects of the present disclosure, following drawings for illustration are provided in the present disclosure.

DETAILED DESCRIPTION

The embodiments of the present disclosure are described in detail below with reference to the accompanying drawings.

Figure 3:
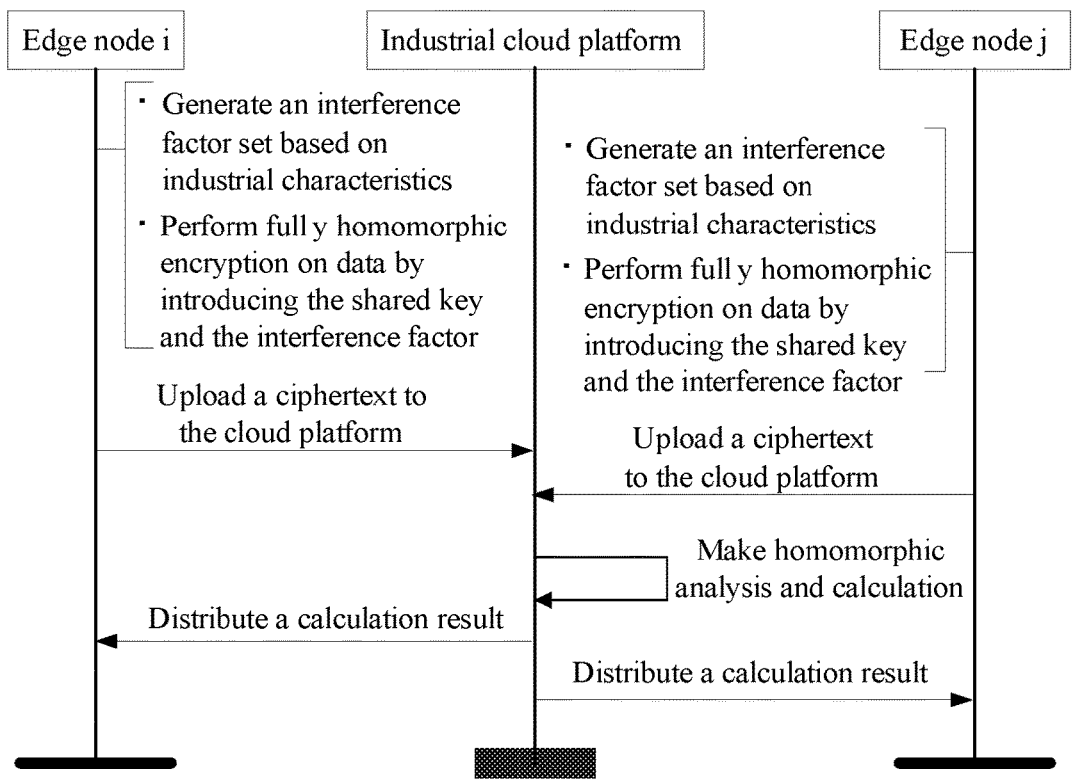
FIG. 3 is a schematic diagram showing a secure collaborative calculation between multiple edge nodes.

A data security sharing method for multiple edge nodes to operate in a collaboration mode under an industrial cloud environment is provided in the present disclosure. Objects involved in the method includes: edge nodes, an industrial cloud platform, and an authority center. Firstly, each of edge nodes requiring for participating in collaborative calculation applies to the authority center for a shared key for collaborative calculation. Secondly, the authority center generates a shared key with a key generation mechanism and distributes the shared key to each of the edge nodes applying for participating in the collaborative calculation. With the key generation mechanism, a forged attack from an illegal edge node can be prevented. Then, each of the edge nodes generates an interference factor set X based on industrial characteristics, and adds different interference factors δ for different types of data, realizing fine-grained sharing of data in collaborative calculation between multiple edge nodes. Then, as shown in FIG. 3, a shared key and an interference factor are introduced by each of the edge nodes participating in the collaboration, based on an integer-based fully homomorphic encryption algorithm, and data of each of the edge nodes is encrypted by using the improved fully homomorphic encryption algorithm and then is uploaded to an industrial cloud platform. With the improved fully homomorphic encryption algorithm, data confidentiality and data interoperability in collaborative calculation between multiple edge nodes can be both ensured. Finally, the industrial cloud platform makes homomorphic analysis and calculation on the data uploaded by each of the edge nodes and sends a result to each of the edge nodes.

1. A Shared Key Management Mechanism

The shared key management mechanism includes generation of a shared key and update of a shared key.

(1) Generation of a Shared Key

Figure 1:
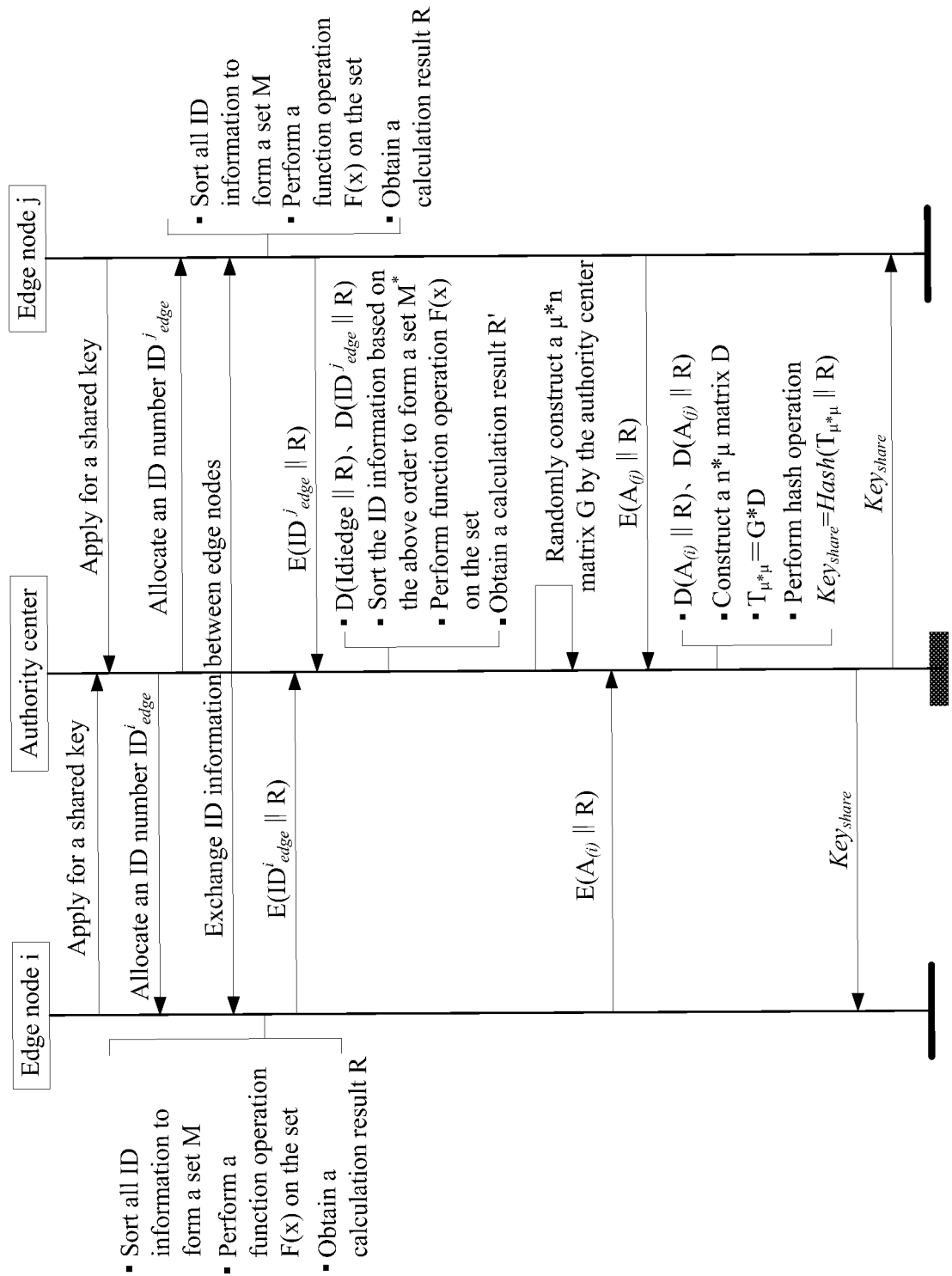
FIG. 1 is a schematic diagram showing generating a shared key.

In step 1, each of edge nodes wanting to participate in collaborative calculation applies to the authority center for a shared key. For ease of description, collaborative calculation between two edge nodes is taken as an example for specific description of the method according to the present disclosure, as shown in FIG. 1. In practice, more edge nodes may participate in collaborative calculation, and the principle and process of collaborative calculation between more edge nodes are consistent with the method described in the present disclosure.

In step 2, the authority center allocates a different ID number to each of the edge nodes which applies for the shared key. In this example, the ID numbers selected by the authority center for the edge nodes are $ID^i_{edge}$ and $ID^j_{edge}$.

In step 3, the edge nodes exchange ID numbers, so that each of the edge nodes in a same collaborative calculation group stores ID numbers of all the edge nodes in the same collaborative calculation group. The authority center sorts all the edge nodes in the same collaborative calculation group based on an order of the ID numbers of the edge nodes from small to large, to form a set $M^s$. In this example, the set $M^s$ is taken as M, and M={$ID^i_{edge}$, $ID^j_{edge}$}. Multiple collaborative calculation groups are under control of the authority center. A same function operation $F(M^s)$ is performed on each of the collaborative calculation groups to obtain a different result $R^s$. The authority center can identify different collaborative calculation groups based on $R^s$, so as to distribute different keys for the different collaborative calculation groups. The reason for introducing the result $R^s$ here is that, in a control region of the authority center, multiple collaborative relationships may be formed between multiple edge nodes. For example, a collaborative relationship is formed between an edge node $ID^i_{edge}$ and an edge node $ID^j_{edge}$, and the two nodes may perform a collaborative calculation, while another collaborative relationship is formed between an edge node $ID^i_{edge}$ and an edge node $ID^k_{edge}$, and the two nodes may perform another collaborative calculation. Thus the authority center can identify different collaborative calculation groups based on $R^s$, to distribute different keys for the different collaborative calculation groups.

The authority center performs a function operation $F(M^s)$ for each collaborative relationship to obtain a different result $R^s$:

$$R^s = F(M^s)$$

where, the function F is any mathematical function to perform mathematical calculations once or more on the edge node set $M^s$, and the specific mathematical function is not limited in the present disclosure.

Since an ID number of each of the edge nodes is unique, and the set $M^s$ formed by all the edge nodes in each of the collaborative calculation groups is unique, the result $R^s$ obtained by performing the function operation $F(M^s)$ is unique.

Therefore, the authority center can identify keys corresponding to different collaborative calculation groups, based on the unique result $R^s$.

In step 4, in this example, the calculation result $R^s$ of the collaborative calculation group formed by the edge node $ID^i_{edge}$ and the edge node $ID^j_{edge}$ is taken as R. The edge nodes $ID^i_{edge}$ performs an encryption operation $E(ID^i_{edge}\|R)$ on data $ID^i_{edge}\|R$ and uploads a result of the encryption operation $E(ID^i_{edge}\|R)$ to the authority center, and the edge nodes $ID^j_{edge}$ performs an encryption operation $E(ID^j_{edge}\|R)$ on data $ID^j_{edge}\|R$ and uploads a result of the encryption operation $E(ID^j_{edge}\|R)$ to the authority center. Where represents a connector for string.

In step 5, the authority center performs decryption operations $D(ID^i_{edge}\|R)$ and $D(ID^j_{edge}\|R)$ with a pre-configured key, extracts all the edge nodes requiring for participate in the same collaborative calculation based on R, sorts the edge nodes based on the order described in step 3 to form a set $M^*$, then performs a same function operation $F(M^*)$ to obtain a result R' finally. In this example, the set obtained by the authority center is $M^*$={$ID^i_{edge}$, $ID^j_{edge}$}. If the edge nodes $ID^i_{edge}$ and $ID^j_{edge}$ participating in collaborative calculation both upload their ID numbers to the authority center, the set $M^*$ obtained by the authority center is the same as the set M of the edge nodes in step S3. The same function operation $F(x)$ is performed on the two same sets, to obtain same calculated results, that is, R=R'.

The authority center determines whether R is equal to R' to prevent a forged attack from an illegal node. For example, an illegal edge node $ID^i_{edge}$ has not reached a collaborative relationship with an edge node $ID^j_{edge}$, but lies to the authority center that it had reached the collaborative relationship with the edge node $ID^j_{edge}$, and the illegal edge node $ID^i_{edge}$ uploads a set M consisting of the ID numbers of the edge node $ID^i_{edge}$ and the edge node $ID^j_{edge}$ to the authority center. Then the authority center will send a same shared key simultaneously to the illegal edge node $ID^i_{edge}$ and the legal edge node $ID^j_{edge}$, thus the illegal edge node $ID^i_{edge}$ can access data of the edge node $ID^j_{edge}$ with the shared key. In the forged attack from the illegal edge node above, only the illegal edge node $ID^i_{edge}$ uploads $ID^i_{edge}\|R$ to the authority center, while the edge node $ID^j_{edge}$ does not upload $ID^j_{edge}\|R$ to the authority center. Therefore, the edge node set $M^*$ obtained by the authority center is inconsistent with the set M sent by the illegal node, then different results are obtained by performing the same function operation $F(x)$ on the two different sets, that is, R≠R'.

In step 6, after determining that the calculated results are the same, that is, R=R', the authority center randomly constructs a μ*n matrix G. Elements in the matrix G belong to a finite field GF (q), μ represents the number of rows of the matrix G and also represents a length of each column matrix of the matrix G, and n represents the number of edge nodes in each of the collaborative calculation groups. In this example, n=2, and a value of μ may be determined based on safety intensity as needed.

In step 7, the edge nodes $ID^i_{edge}$ randomly generates a column matrix $A_{(i)}$ in which the number of elements is equal to μ, performs an encryption operation $E(A_{(i)}\|R)$ on the column matrix $A_{(i)}$, and uploads a result of the encryption operation $E(A_{(i)}\|R)$ to the authority center; and the edge nodes $ID^j_{edge}$ randomly generates a column matrix $A_{(j)}$ in which the number of elements is equal to μ, performs an encryption operation $E(A_{(j)}\|R)$ on the column matrix $A_{(j)}$, and uploads a result of the encryption operation $E(A_{(j)}\|R)$ to the authority center. All elements of the column matrix belong to the finite field GF(q).

In step 8, the authority center performs decryption operations $D(A_{(i)}\|R)$ and $D(A_{(j)}\|R)$ with a pre-configured key, extracts the column matrixes of the edge nodes $ID^i_{edge}$ and $ID^j_{edge}$ participating in the same collaborative calculation group, randomly recombines the column matrixes $A_{(i)}$ and $A_{(j)}$ into a n*μ matrix D, then performs matrix operation $T_{\mu*\mu}$=G*D (where $T_{\mu*\mu}$ is a newly generated matrix for generating the shared key), and finally performs hash operation $Key_{share}$=Hash($T_{\mu*\mu}\|R$) by introducing R and the matrix $T_{\mu*\mu}$, to generate the shared key and distribute the generated shared key to the corresponding edge node. In this example, n=2. The reason for the authority center to perform hash operation by introducing R and the matrix $T_{\mu*\mu}$ is to avoid generating a same key for different collaborative calculation groups.

(2) Update of a Shared Key

In two cases, the authority center will update the shared key. One case is that the authority center detects an illegal edge node. The other case is that a new edge node joins to the edge nodes which have established a cooperative calculation, to perform a new collaborative calculation.

Figure 4:
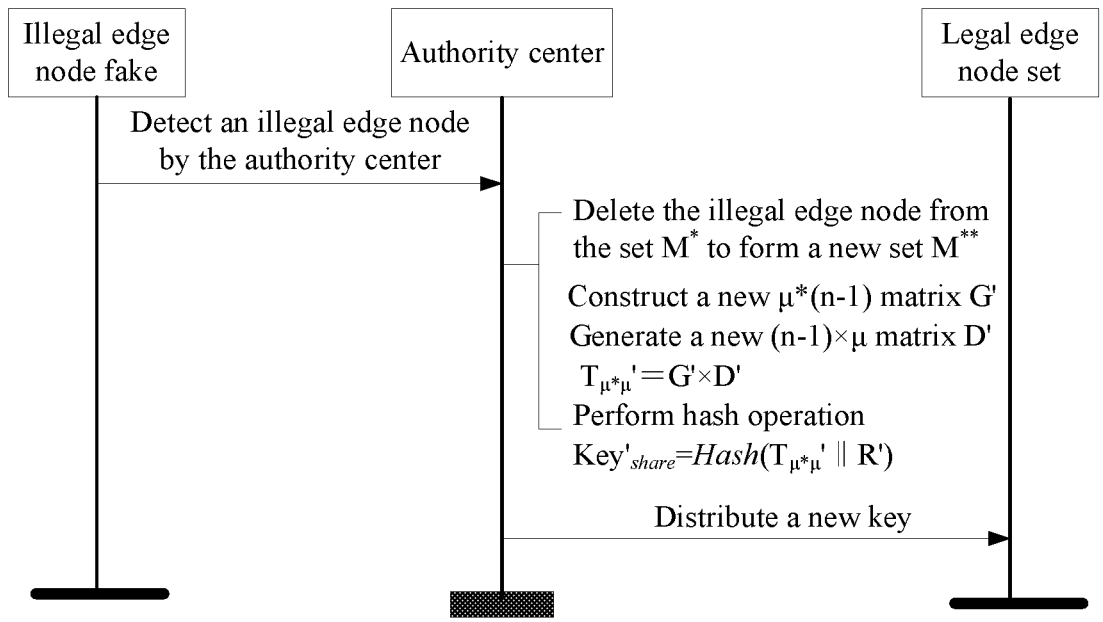
FIG. 4 is a schematic diagram showing updating a shared key in a case that an illegal edge node is detected by an authority center.

1) Update of a Shared Key Due to the Detection of an Illegal Edge Node by the Authority Center The edge node $ID^i_{edge}$ or $ID^j_{edge}$ is captured to be an illegal edge node. The illegal edge node is represented by $ID^{fake}_{edge}$. FIG. 4 is a schematic diagram showing updating a shared key by an authority center after detecting an illegal edge node. The key is updated to ensure the backward security of the network, that is, the illegal edge node $ID^{fake}_{edge}$ cannot obtain the updated key and thus cannot obtain the calculation data subsequently generated between the legal edge nodes. It is noted that the detection algorithm for the illegal edge node is not limited in the present disclosure.

In step 1, after obtaining information about the illegal edge node $ID^{fake}_{edge}$, the authority center deletes the illegal edge node $ID^{fake}_{edge}$ from the edge node set M*. The edge node set after the deletion is M**.

In step 2, the authority center randomly constructs a new $\mu*(n-1)$ matrix G'. Since the illegal edge node $ID^{fake}_{edge}$ is deleted, the number of edge nodes participating in a new collaborative calculation is reduced from n to n−1.

In step 3, the authority center generates a new $(n-1)\times\mu$ matrix D' by randomly recombining column matrixes corresponding to edge nodes in the new edge node set, then performs a matrix operation $T_{\mu*\mu}'\times D'$, and finally performs hash operation by introducing R' and the matrix $T_{\mu*\mu}'$.

2) Update of a Shared Key Due to the Addition of a New Edge Node into a Collaborative Calculation Group If a new edge node is added into a collaborative calculation group, it is required for the authority center to update the shared key to prevent the new edge node from obtaining, with the non-updated key, the collaborative calculation data between other edge nodes which is generated before the new edge node participates in a collaborative calculation, thereby ensuring the forward security of the collaborative calculation data.

Figure 5:
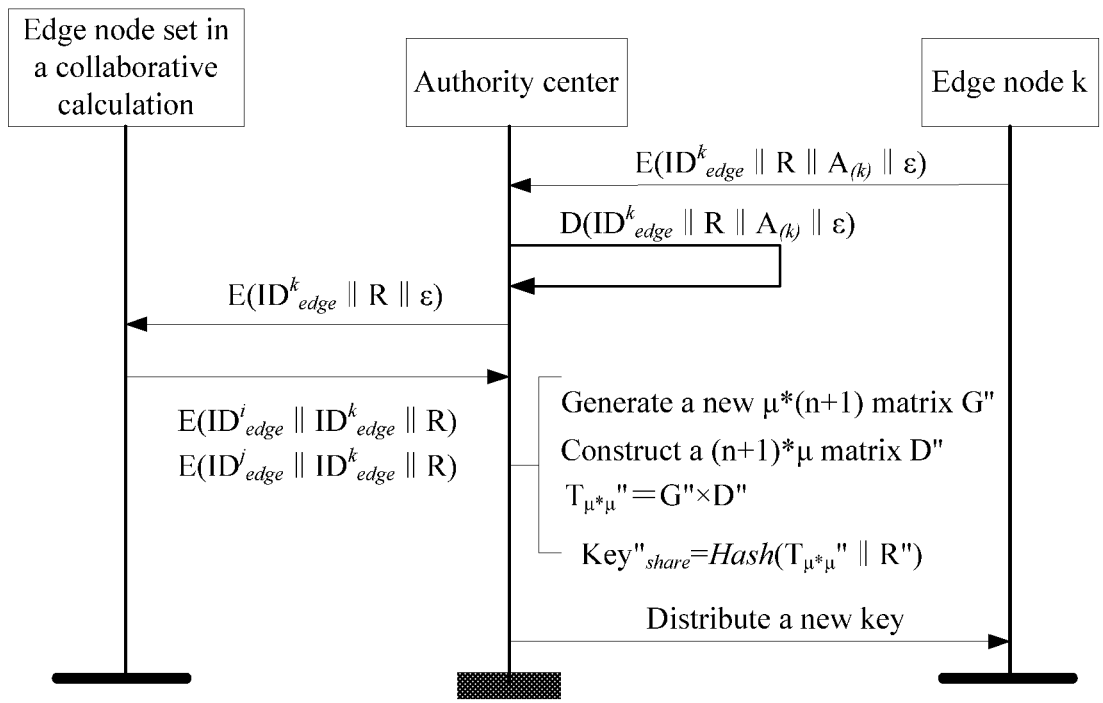
FIG. 5 is a schematic diagram showing updating a shared key in a case that a new edge node is added.

In this example, the shared key is updated due to the addition of a new edge node k into a collaborative calculation group consisting of an edge node $ID^i_{edge}$ and an edge node $ID^k_{edge}$, as shown in FIG. 5.

In step 1, the new edge node k randomly constructs a column matrix $A_{(k)}$, where $A_{(k)}$ is a column matrix corresponding to the new edge node k and has a length of $\mu$; then the new edge node k performs an encryption operation $E(ID^k_{edge}\|R\|A_{(k)}\|\epsilon)$ on a result R corresponding to the collaborative calculation group consisting of the edge node $ID^k_{edge}$ and the edge node $ID^j_{edge}$, an ID number $ID^k_{edge}$ of the new edge node, the column matrix $A_{(k)}$, and a symbol ε indicating that the new edge node requests to participate in a collaborative calculation, and then the new edge node k uploads a result of the encryption operation $E(ID^k_{edge}\|R\|A_{(k)}\|\epsilon)$ to the authority center.

In step 2, the authority center performs decryption operations $D(ID^k_{edge}\|R\|A_{(k)}\|\epsilon)$ with a pre-configured key, then knows the request that the new edge node $ID^k_{edge}$ wants to participate in a cooperative calculation from ε, and then determines that the new edge node wants to participate in the collaborative calculation group consisting of the edge node $ID^i_{edge}$ and the edge node $ID^k_{edge}$ based on the result R. After determining the collaborative calculation group in which the new edge node wants to participate, the authority center simultaneously verifies with the edge nodes $ID^i_{edge}$ and $ID^j_{edge}$, and verification information is sent in a format of $E(ID^k_{edge}\|R\|\epsilon)$.

In step 3, the edge nodes $ID^k_{edge}$ and $ID^j_{edge}$ receive the verification information and perform decryption operation $D(ID^k_{edge}\|R\|\epsilon)$ respectively, and know the request that the new edge node $ID^k_{edge}$ wants to participate in the collaborative calculation group consisting of the edge node $ID^k_{edge}$ and the edge node $ID^i_{edge}$ based on ε and R. If $ID^i_{edge}$ agrees with $ID^k_{edge}$ to participate in the collaborative calculation group, $ID^i_{edge}$ sends $E(ID^i_{edge}\|ID^k_{edge}\|R)$ to the authority center; and similarly if $ID^j_{edge}$ agrees with $ID^k_{edge}$ to participate in the collaborative calculation group, $ID^j_{edge}$ sends $E(ID^j_{edge}\|ID^k_{edge}\|R)$ to the authority center.

In step 4, the authority center collects other edge nodes which agree with the edge node $ID^k_{edge}$ to participate in the collaborative calculation based on R, to form an edge node set M*. If the edge nodes $ID^i_{edge}$ and $ID^j_{edge}$ both agree with the edge node $ID^k_{edge}$ to participate in the collaborative calculation and send verification messages to the authority center, then the edge node set M* is the same as the edge node set M corresponding to the collaborative calculation group consisting of the edge node $ID^i_{edge}$ and the edge node $ID^j_{edge}$. After respectively performing the same function operation F(x) on M*** and M, the authority center obtains same results R" and R, that is, R"=R.

In step 5, if the authority center obtains the same results R" and R, the authority center randomly recombines the matrixes corresponding to a new set to generate a new $\mu*(n+1)$ matrix G", then randomly recombines the column matrixes of all the edge nodes in the same collaborative calculation group to form a $(n+1)*\mu$ matrix D", and then performs a matrix operation $T_{\mu*\mu}"=G"\times D"$, and finally performs hash operation $Key"_{share}=Hash(T_{\mu*\mu}"\|R")$ by introducing R" and the matrix $T_{\mu*\mu}"$.

2. Generation Mechanism of Interference Factors for Different Types of Data

An enterprise user may choose one or more of industrial protocol, network ID, data source address, data attribute, sensor type, and processing priority as interference factors, to achieve more fine-grained sharing of industrial data. For different industrial scenarios, the enterprise user may choose different industrial attributes as interference factors according to their own situation and determine a byte length of an industrial attribute.

Figure 2:
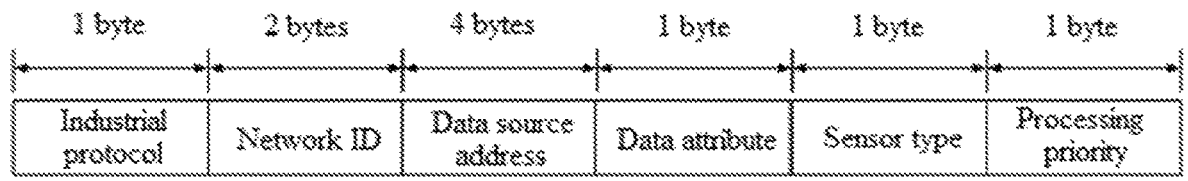
FIG. 2 is a schematic diagram of interference factors.

As shown in FIG. 2, it is advised that:

industrial protocol occupies 1 byte, ranging from 0X00 to 0XFF;

network ID occupies 2 bytes, ranging from 0X0000 to 0XFFFF;

data source address occupies 4 bytes, ranging from 0X00000000 to 0XFFFFFFFF;

data attribute occupies 1 byte, ranging from 0X00 to 0XFF;

sensor type occupies 1 byte, ranging from 0X00 to 0XFF;

processing priority occupies 1 byte, ranging from 0X00 to 0XFF; and the interference factor is added at an end of plaintext data of different types of data.

3. An Improved Fully Homomorphic Encryption Algorithm by Introducing a Shared Key and an Interference Factor (1) Parameter Selection Multiple parameters are involved in the algorithm, and all the parameters below are determined based on a safety parameter X:

γ represents a bit length of a public key;

η represents a bit length of a private key;

ρ represents a bit length of noise;

τ represents the number of public key samples, x represents a public key sample, and a public key sample set L is $\{x_0, x_1, \ldots, x_\tau\}$, and $pk=\Sigma_0^\tau x_i$.

The parameters are determined as: $\rho=\lambda$, $\eta=O(\lambda^2)$, $\gamma=O(\lambda^5)$, $\tau=\gamma+\lambda$, $\rho'=2\lambda$, where ρ' represents a secondary noise parameter, and O(x) represents a time complexity function.

To ensure the security of the integer-based fully homomorphic encryption algorithm, parameters in the public key in an existing algorithm may be selected as follows.

$$D_{\gamma,\rho}(p) = \left\{ \text{Select } q \in \left( Z \cap \left[ 0, \frac{2^\gamma}{p} \right] \right) \right\},$$

$p_{sk} \in ((2Z+1) \cap (2^{\eta-1}, 2^\eta))$, $p_{share} \in ((2Z+1) \cap (2^{\eta-1}, 2^\eta))$, output: $x_i = p_{sk} q p_{share} + 2r_i$), where $p_{sk}$ represents a private key of an edge node, $p_{share}$ represents a shared key of the edge node, Z represents an integer symbol in mathematics, q and $r_i$ each represents a random large prime number, $D_{\gamma,\rho}(p)$ represents a distribution function, $x_i$ represents an i-th public key sample in the public key sample set L.

(2) Construction of the Scheme

1) KeyGen($\lambda$): for a public key sample $x_i \in D_{\gamma,\rho}(p)$, i=0 . . . , τ. Where $x_0$ is the largest and an odd number, $r_p(x_0)$ is an even number, and $r_p(x_0)$ represents a remainder of $x_0$ divided by r.

2) E($p_{sk}$, m'E{0,1}): selecting a random subset S"⊆{1, 2, . . . τ} and a random integer r⊆(−2^{p'}, 2^{p'}), outputting c←$[m'+\delta+2r+\Sigma_{i \in S} x_i]_{x_0}$. Where $[m'+\delta+2r+\Sigma_{i \in S} x_i]_{x_0}$ represents a remainder of $m'+\delta+2r+\Sigma_{i \in S} x_i$ divided by $x_0$, and δ represents an interference factor.

Evaluate($p_{sk}$, C, c): assuming that a bootstrap circuit having a bootstrap circuit function is a circuit C having t inputs, the inputs of the function includes a public key $p_{sk}$, the (binary) circuit C having t inputs, and t corresponding ciphertexts c=$c_1, c_2, \ldots, c_t$. The (integer) addition gates and multiplication gates of the circuit C are applied to the ciphertexts, and all operations are performed on integers, to return an integer result.

4) Decrypt$_{share}$($p_{share}$, c, δ) is a decryption algorithm for shared data, and outputs m'←((c−δ)mod $p_{share}$)mod 2.

Finally, it should be noted that the embodiments are only used to illustrate rather than limit the technical solutions of the present disclosure. Although the present disclosure has been described in detail through the above embodiments, those skilled in the art should understand that various modifications can be made to the present disclosure in form and details without departing from the scope of the claims of the present disclosure.

The invention claimed is:

1. A data security sharing method for a plurality of edge nodes to operate in a collaboration mode under an industrial cloud environment, where objects involved in the method comprises: edge nodes, an industrial cloud platform, and an authority center, and the method comprises the following steps:

in S1, applying to the authority center for a shared key by each of the edge nodes to participate in collaborative calculation;

in S2, allocating, by the authority center, a different ID number to each of the edge nodes applying for the shared key, wherein the ID number is recorded as ID$^m_{edge}$, m={i, . . . , j}, m represents a node number set, and i and j each represents a node number;

in S3, exchanging ID numbers between edge nodes in a same collaborative calculation group, so that each of the edge nodes in the same collaborative calculation group stores ID numbers of all the edge nodes in the same collaborative calculation group; sorting, by the authority center, all edge nodes in each of the collaborative calculation groups based on an order of the ID numbers of the edge nodes from small to large, to form a different set, wherein the set is recorded as M$^s$; assuming that S collaborative calculation groups are under control of the authority center, then s={1, . . . , S}, M$^s$={ID$^i_{edge}$, . . . , ID$^j_{edge}$}, wherein a different set M$^s$ corresponds to a different node number set; performing a same function operation F(M$^s$) on the set M$^s$ corresponding to each of the collaborative calculation groups to obtain a different result, which is recorded as R$^s$; the set M$^s$ having a one-to-one correspondence with the result R$^s$; and identifying, by the authority center, different collaborative calculation groups based on R$^s$, to distribute different keys for the different collaborative calculation groups;

in S4, performing, by each of the edge nodes ID$^m_{edge}$, encryption operation E(ID$^m_{edge}$||R$^s$) on data ID$^m_{edge}$||R$^s$, and uploading, by each of the edge nodes ID$^m_{edge}$, a result of the encryption operation E(ID$^m_{edge}$||R$^s$) to the authority center, wherein "||" represents a connector for string, and E(x) represents an encryption function;

in S5, performing decryption operation D(ID$^m_{edge}$||R$^s$) by the authority center, with a pre-configured key; extracting, by the authority center, different collaborative calculation groups based on different results R$^s$; sorting edge nodes in each of the extracted collaborative calculation groups based on the order described in step S3, to form a different set M$^{s*}$={ID$^i_{edge}$*, . . . ID$^j_{edge}$*}; performing a same function operation F(M$^{s*}$) to obtain a different result R$^{s'}$; wherein D(x) is a decryption function for decrypting data encrypted by E(x);

in S6, randomly constructing, by the authority center, a different μ*n matrix G for each of the collaborative calculation groups satisfying R$^s$=R$^{s'}$, wherein elements in the matrix G belong to a finite field GF(q), q is a large prime number, μ represents the number of rows of the matrix G, that is, a length of each column matrix of the matrix G, and n represents the number of edge nodes in each of the collaborative calculation groups;

in S7, randomly generating, by each of the edge nodes ID$^m_{edge}$, a column matrix A$_{(m)}$ having μ elements, performing an encryption operation E(A$_{(m)}$||R), by each of the edge nodes ID$^m_{edge}$, on the column matrix A$_{(m)}$, where R is a specific value of calculation result of each of the collaborative calculation groups, and uploading, by each of the edge nodes ID$^m_{edge}$, a result of the encryption operation E(A$_{(m)}$||R) to the authority center, wherein all elements of the column matrix belong to the finite field GF(q), and each of the edge nodes ID$^m_{edge}$ has a one-to-one correspondence with a column matrix A$_{(m)}$;

in S8, performing decryption operation D(A$_{(m)}$||R$^s$), by the authority center, with the pre-configured key; extracting, by the authority center, a column matrix corresponding to each of the edge nodes in each of the collaborative calculation groups based on R$^s$; randomly recombining, by the authority center, all column matrixes corresponding to each of the collaborative calculation groups into a different n*μ matrix D; then performing, by the authority center, matrix operation T$_{μ*μ}$=G*D, wherein T$_{μ*μ}$ is a newly generated matrix for generating the shared key; finally, performing, by the authority center, hash operation by introducing R and the matrix T$_{μ*μ}$ to generate the shared key, and distributing, by the authority center, the generated different shared key to a corresponding collaborative calculation group;

in S9, generating, by each of the edge nodes in each of the collaborative calculation groups, a different interference factor set X based on industrial characteristics, wherein the interference factor set X comprises different interference factors δ, and the different interference factors δ are added for different types of data;

in S10, performing, by each of the edge nodes in each of the collaborative calculation groups, fully homomorphic encryption on data by introducing the shared key and the interference factor, and uploading, by each of the edge nodes in each of the collaborative calculation groups, a ciphertext to the industrial cloud platform; and in S11, making, by the industrial cloud platform, homomorphic analysis and calculation on the fully homomorphic encrypted ciphertext, and distributing, by the industrial cloud platform, a processing result to the corresponding collaborative calculation group.

2. The data security sharing method for a plurality of edge nodes to operate in a collaboration mode under an industrial cloud environment according to claim 1, wherein in the step S3, the authority center performs the same function operation $F(M^s)$ for each collaborative relationship to obtain the different result $R^s$:

$$R^s = F(M^s),$$

wherein, the function F is any mathematical function to perform mathematical calculations once or more on the set $M^s$ of edge nodes.

3. The data security sharing method for a plurality of edge nodes to operate in a collaboration mode under an industrial cloud environment according to claim 1, wherein in the step S5, the authority center determines whether $R^s$ is equal to $R^{s'}$, to prevent a forged attack from an illegal node.

4. The data security sharing method for a plurality of edge nodes to operate in a collaboration mode under an industrial cloud environment according to claim 1, wherein in the step S8, the authority center performs hash operation $Key_{share} = Hash(T_{\mu*\mu} \| R)$ by introducing $R^s$ and the matrix $T_{\mu*\mu}$ to generate the shared key, and distributes the generated shared key to the corresponding collaborative calculation group.

5. The data security sharing method for a plurality of edge nodes to operate in a collaboration mode under an industrial cloud environment according to claim 1, wherein in the step S9, the interference factor comprises one or more of industrial protocol, network ID, data source address, data attribute, sensor type, and processing priority.

6. The data security sharing method for a plurality of edge nodes to operate in a collaboration mode under an industrial cloud environment according to claim 1, wherein in the step S10, on a basis of an existing integer-based fully homomorphic encryption algorithm, an encryption function $c = m' + 2r + \Sigma_{i \in S} x_i$ with $x_i = p_{sk} q + 2r_i$ is improved to $c = m' + \delta + 2r + \Sigma_{i \in S} x_i$ with $x_i = p_{sk} q p_{share} + 2r_i$, and a decryption function $m' = (c \bmod p_{sk}) \bmod 2$ is improved to $m' = ((c - \delta) \bmod p_{share}) \bmod 2$, wherein $p_{share}$ represents a shared key, $\delta$ represents an interference factor, c represents an encrypted ciphertext, m' represents a plaintext, q, r and $r_i$ each represents a random large prime number, $x_i$ represents an i-th public key sample in a public key sample set L, and $p_{sk}$ represents a private key.

7. The data security sharing method for a plurality of edge nodes to operate in a collaboration mode under an industrial cloud environment according to claim 1, further comprising:

during collaborative calculation between multiple edge nodes, when the authority center detects that an edge node is an illegal edge node, updating, by the authority center, a shared key of a collaborative calculation group where the illegal edge node is located and distributing, by the authority center, the updated shared key to other edge nodes except the illegal edge node in the collaborative calculation group; and updating a key when a new edge node joins a collaborative calculation group during the collaborative calculation group performs a collaborative calculation.

* * * * *